(12) United States Patent
Shibasaki et al.

(10) Patent No.: US 10,525,647 B2
(45) Date of Patent: Jan. 7, 2020

(54) SERVO PRESS MACHINE, MOTOR USING SERVO PRESS MACHINE, AND METHOD OF ASSEMBLING AND DETACHING MOTOR

(71) Applicant: AIDA ENGINEERING, LTD., Kanagawa (JP)

(72) Inventors: Shougo Shibasaki, Sagamihara (JP); Masataka Yahara, Sagamihara (JP); Fumio Tajima, Sagamihara (JP)

(73) Assignee: AIDA ENGINEERING, LTD., Kanagawa (JP)

( * ) Notice: Subject to any disclaimer, the term of this patent is extended or adjusted under 35 U.S.C. 154(b) by 617 days.

(21) Appl. No.: 15/222,625

(22) Filed: Jul. 28, 2016

(65) Prior Publication Data
US 2017/0066213 A1    Mar. 9, 2017

(30) Foreign Application Priority Data

Sep. 9, 2015    (JP) ................. 2015-177735

(51) Int. Cl.
*B30B 1/26*    (2006.01)
*H02K 1/27*    (2006.01)
(Continued)

(52) U.S. Cl.
CPC ............ *B30B 1/266* (2013.01); *H02K 1/14* (2013.01); *H02K 1/2793* (2013.01); *H02K 7/075* (2013.01);
(Continued)

(58) Field of Classification Search
CPC .. B30B 1/00; B30B 1/14; B30B 1/188; B30B 1/26; B30B 1/266; H02K 1/12;
(Continued)

(56) References Cited

U.S. PATENT DOCUMENTS 2,438,629 A * 3/1948 Anderson ............. H02K 1/182
310/211
3,043,971 A * 7/1962 Stevens .................. H02K 1/12
29/463
(Continued)

FOREIGN PATENT DOCUMENTS

CN          203004339 U      6/2013
DE    10 2009 051 876 A1    5/2011
(Continued)

OTHER PUBLICATIONS

"Customized wing motor for motor mounting," Jan. 6, 2012, Control Engineering, 59.2 (Year: 2012).*
(Continued)

*Primary Examiner* — Shelley M Self
*Assistant Examiner* — Katie L. Parr
(74) *Attorney, Agent, or Firm* — McDermott Will & Emery LLP

(57) ABSTRACT

Provided is a servo press machine having a configuration that allows miniaturization of the servo press machine, and a motor using the same. A servo press machine includes a servomotor, a crankshaft rotated by driving of the servomotor, a connecting rod connected to an eccentric portion of the crankshaft, and a slide connected to the connecting rod, wherein two connecting rods are connected to the crankshaft, the servomotor is an axial gap motor, a rotor of the axial gap motor is assembled with the crankshaft between the two connecting rods, and a stator of the axial gap motor is fixed to a crown in which the crankshaft is housed.

7 Claims, 14 Drawing Sheets

(51) Int. Cl.
*H02K 7/075* (2006.01)
*H02K 15/00* (2006.01)
*H02K 21/24* (2006.01)
*H02K 1/14* (2006.01)

(52) U.S. Cl.
CPC ......... *H02K 15/00* (2013.01); *H02K 15/0006* (2013.01); *H02K 21/24* (2013.01)

(58) Field of Classification Search
CPC .. H02K 1/14; H02K 1/22; H02K 1/27; H02K 1/2793; H02K 7/07; H02K 21/24; H02K 1/28; H02K 7/06; H02K 7/075; H02K 21/21; B21D 19/086; B21J 9/18
USPC .................. 100/282; 72/452.5; 310/156.22, 310/216.008, 216.088, 268
See application file for complete search history.

(56) References Cited

U.S. PATENT DOCUMENTS

| | | | | |
|---|---|---|---|---|
| 4,695,419 A * | 9/1987 | Inariba | ................ | H02K 15/022 264/259 |
| 6,646,535 B2 * | 11/2003 | Miyake | ................ | H02K 1/148 310/216.074 |
| 6,913,044 B2 * | 7/2005 | Zwehl | ................ | D03D 49/60 139/1 E |
| 7,667,368 B2 * | 2/2010 | Matsuzaki | ............ | H02K 3/524 310/194 |
| 8,726,802 B2 * | 5/2014 | Senda | ................ | B23Q 15/18 100/48 |
| 8,776,682 B2 * | 7/2014 | Fahrenbach | ............ | B30B 1/266 100/282 |
| 2004/0113511 A1 * | 6/2004 | Schmidt | ................ | H02K 1/148 310/216.061 |
| 2006/0163964 A1 * | 7/2006 | Kojima | ................ | H02K 1/148 310/156.37 |
| 2012/0180675 A1 * | 7/2012 | Graf | ........................ | B30B 1/266 100/282 |
| 2012/0266766 A1 * | 10/2012 | Graf | ........................ | B30B 1/266 100/282 |
| 2012/0272843 A1 * | 11/2012 | Graff | ........................ | B30B 1/266 100/193 |
| 2016/0226355 A1 * | 8/2016 | Arita | ........................ | H02K 21/44 |

FOREIGN PATENT DOCUMENTS

| | | |
|---|---|---|
| DE | 10 2009 051 939 A1 | 5/2011 |
| DE | 10 2010 031 107 A1 | 1/2012 |
| EP | 1 684 399 A2 | 7/2006 |
| EP | 2 626 197 A1 | 8/2013 |
| JP | 2001-062596 A | 3/2001 |
| JP | 2011-254618 A | 12/2011 |
| JP | 2013-031242 A | 2/2013 |
| WO | 2012/007984 A1 | 1/2012 |

OTHER PUBLICATIONS

Japanese Notice of Reasons for Refusal issued in corresponding Japanese Patent Application No. 2015-177735, dated Aug. 30, 2016, with English Translation.
Extended European Search Report issued in corresponding European Patent Application No. 16183083.1-1703, dated Jul. 27, 2017.
Chinese Office Action issued in corresponding Chinese Patent Application No. 201610804867.1, dated Nov. 27, 2017, with English Translation.

* cited by examiner

F I G. 2 A
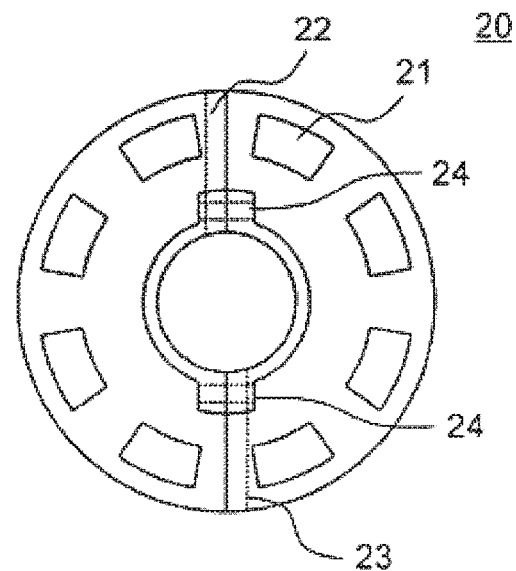
F I G. 2 B
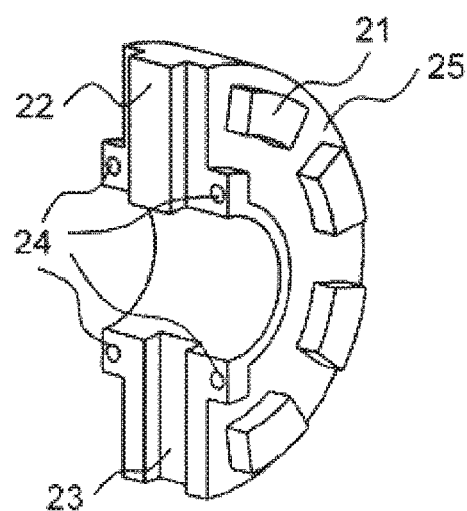

F I G. 2 C
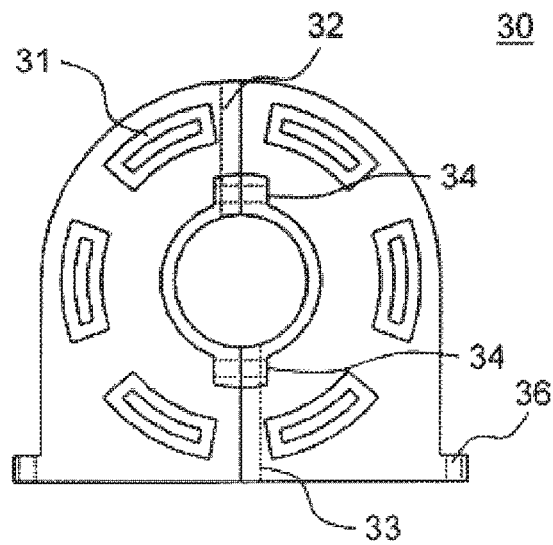
F I G. 2 D
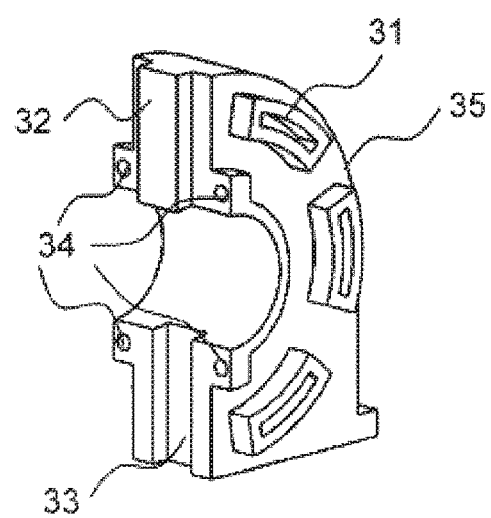

F I G. 6 C
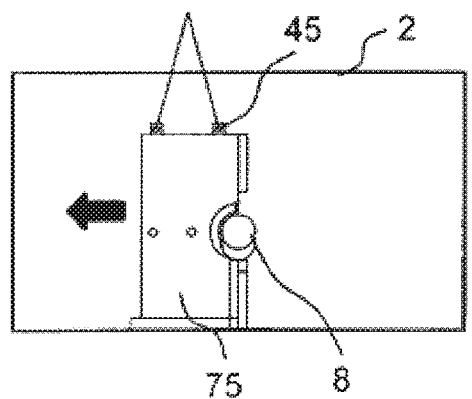
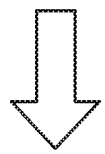
F I G. 6 D
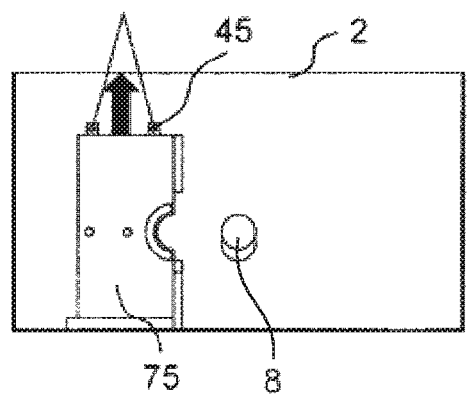

F I G. 7 A
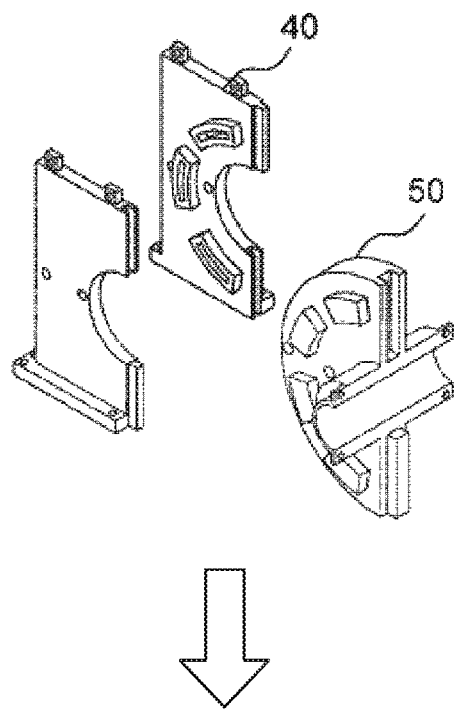
F I G. 7 B
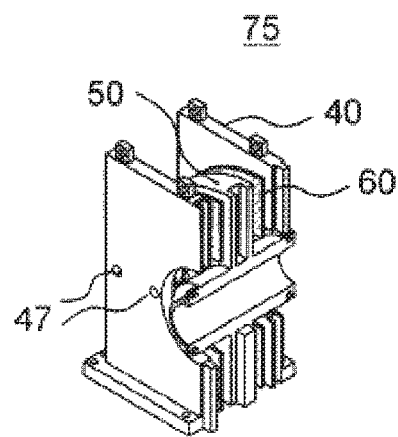

SERVO PRESS MACHINE, MOTOR USING SERVO PRESS MACHINE, AND METHOD OF ASSEMBLING AND DETACHING MOTOR

CROSS REFERENCE TO RELATED APPLICATIONS

This application claims priority to Japanese Patent Application No. 2015-177735, filed on Sep. 9, 2015, the disclosure of which is hereby incorporated by reference.

TECHNICAL FIELD

The present invention relates to miniaturization of a servo press machine, and particularly relates to a motor using the same, a method of assembling and detaching the motor, and a servo press machine using the same.

BACKGROUND ART

A servo press machine performs pressing using a servomotor as source power. That is, rotation of the servomotor is delivered to a crankshaft through a motor shaft having a gear and a reducer, and a slide is moved up and down through the crankshaft, thereby performing pressing. For this reason, a space for installing the servomotor in the press machine needs to be separately prepared, which is one obstructive factor for miniaturization.

JP 2001-62596 A (Patent Document 1) is an example of a background art for miniaturizing the servo press machine. Patent Document 1 discloses a configuration in which a servomotor having a radial-type hollow rotor is directly assembled with a crankshaft.

CITATION LIST

Patent Document

Patent Document 1: JP 2001-62596 A

SUMMARY OF THE INVENTION

Problems to be Solved by the Invention

Patent Document 1 is effective in miniaturization of the servo press machine in a vertical direction since the servomotor is directly installed in the crankshaft, and thus a gear or a reducer is unnecessary. However, motors are installed at both side ends of an eccentric portion of the crankshaft, and thus a motor is disposed to drive a crank portion outside a connecting rod connected to the eccentric portion, and a space for installing the motor on the outside is needed. Thus, there is a problem in that the servo press machine increases in size in a width direction.

The invention provides a servo press machine having a configuration capable of miniaturizing the servo press machine, and a motor using the same in order to solve the above-mentioned problem.

Solutions to Problems

To solve the above-mentioned problem, an example of the invention is a servo press machine including a servomotor, a crankshaft rotated by driving of the servomotor, a connecting rod connected to an eccentric portion of the crankshaft, and a slide connected to the connecting rod, wherein two connecting rods are connected to the crankshaft, the servomotor is an axial gap motor, a rotor of the axial gap motor is assembled with the crankshaft between the two connecting rods, and a stator of the axial gap motor is fixed to a crown in which the crankshaft is housed.

Effects of the Invention

According to the invention, it is possible to provide a servo press machine having a configuration that can achieve miniaturization, and a motor using the same.

BRIEF DESCRIPTION OF THE DRAWINGS

FIGS. 2A to 2D are structural diagrams of an axial gap motor in Embodiment 2.

FIGS. 6A to 6D are diagrams for description of a method of detaching a motor from a press machine in Embodiment 4.

FIGS. 7A to 7E are diagrams for description of a method of assembling the motor with the press machine in Embodiment 4.

MODE FOR CARRYING OUT THE INVENTION

Embodiments of the invention will be described using drawings. It should be noted that the invention is not restricted by the embodiments.

Embodiment 1

Figure 8:
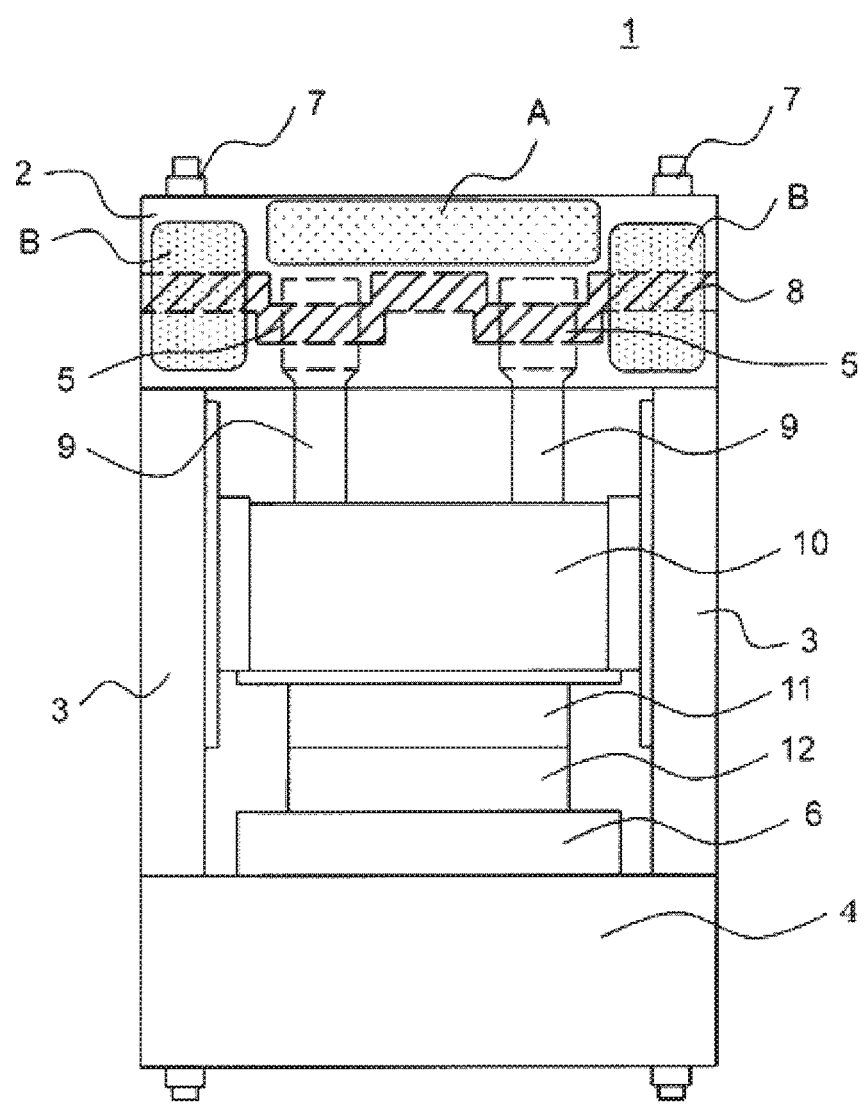
FIG. 8 is a schematic diagram of a configuration of a general servo press machine.

First, a description will be given of a configuration of a general servo press machine which is a premise of the present embodiment. FIG. 8 is a schematic diagram of a configuration of a so-called straight side-type servo press machine 1.

Referring to FIG. 8, a crown 2 is a portion corresponding to a head of the press machine. The crown 2 houses components including gears such as a power component such as a servomotor, a reducer for reducing the speed of rotation thereof, and shafts such as a crankshaft. A column 3 is a columnar portion positioned between the crown 2 and a bed 4. The bed 4 is a portion for fixing a bolster 6 to which a female mold 12 of a mold is attached. A tie rod 7 is a rod for reinforcement penetrating through the bed 4, the column 3, and the crown 2. Deformation of a frame occurring when load is applied to the press machine is made small by fastening both ends of the rod using nuts. A crankshaft 8 has an eccentric portion 5, and has a function of converting a rotary motion to a reciprocating motion. A connecting rod (con-rod) 9 is a portion that connects the crankshaft 8 to a slide 10. The slide 10 is a portion that moves up and down or reciprocates by the crankshaft 8 or the connecting rod 9, and applies press to the bed 4. A male mode 11 of the mold is attached to a lower surface of the slide 10, and the female mold 12 of the mold is attached to an upper surface of the bolster 6. A material is placed between the male mold and the female mold, and the material is molded by being put between upper and lower molds. The bolster 6 is a portion for attaching the female mold 12 of the mold.

The general servo press machine delivers rotation of the servomotor to the crankshaft 8 through a motor shaft having a gear and the reducer, and converts a rotary motion to a reciprocating motion through the eccentric portion 5 of the crankshaft 8 to move the slide 10 up and down through the connecting rod 9, thereby performing pressing. For this reason, a space of a region A illustrated in FIG. 8 has been needed as a space for installing the servomotor, the motor shaft having the gear, the reducer, and the like.

In addition, in Patent Document 1, motors are installed at both side ends of the eccentric portion of the crankshaft, and thus a motor is disposed in a region B illustrated FIG. 8 to drive a crankshaft portion outside the connecting rod 9 connected to the eccentric portion 5. For example, in a servo press machine having two connecting rods for one crankshaft, a certain distance needs to be put between the two connecting rods, and thus the distance cannot be extremely narrowed. Therefore, a space for installing a motor on the outside is needed, and there has been a problem in that the servo press machine increases in size in a width direction.

In this regard, the present embodiment is configured to solve the above-mentioned problem. Hereinafter, a description thereof will be given with reference to drawings.

Figure 1:
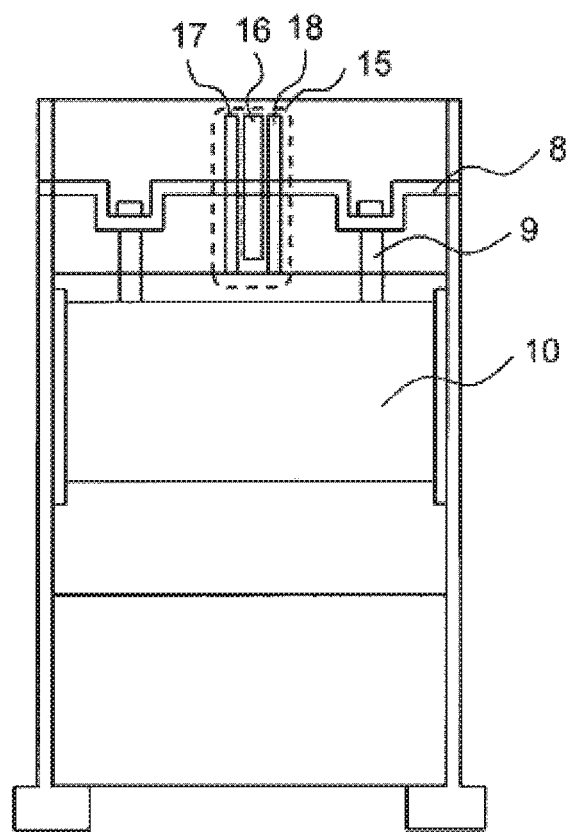
FIG. 1 is a schematic diagram of a configuration of a servo press machine in Embodiment 1.
Figure 3A:
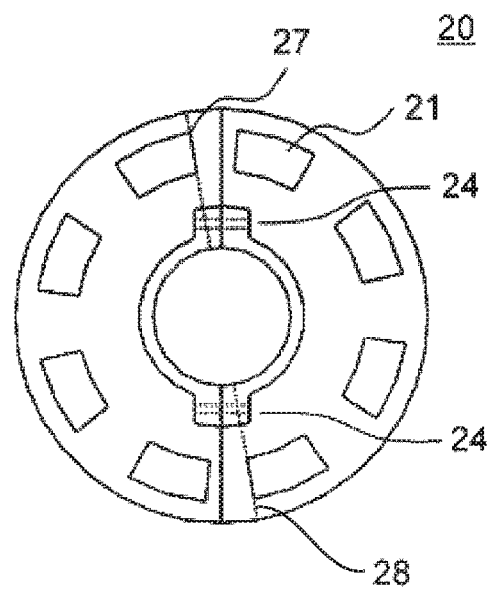
FIGS. 3A to 3D are other structural diagrams of the axial gap motor in Embodiment 2.
Figure 3B:
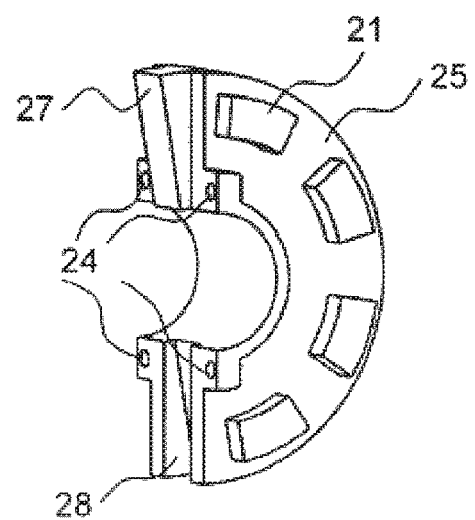
Figure 3C:
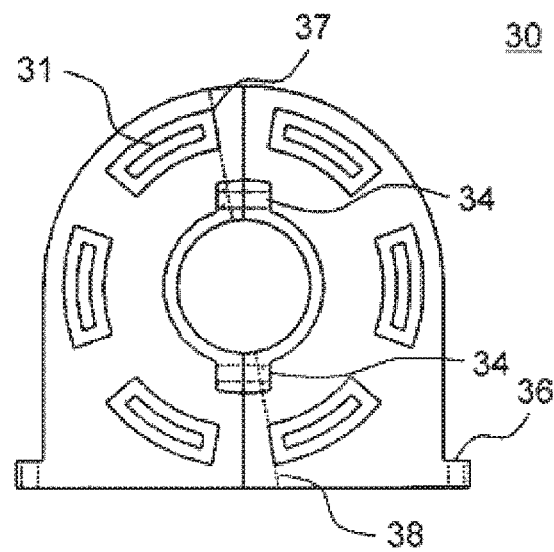
Figure 3D:
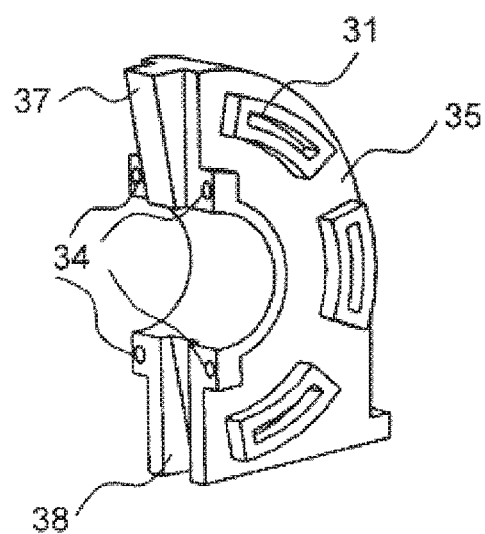

FIG. 1 is a schematic diagram of a configuration of a servo press machine in the present embodiment. Referring to FIG. 1, the same reference numeral is applied to a component having the same function as that of FIG. 8, and a description thereof will be omitted.

Referring to FIG. 1, a reference numeral 15 corresponds to an axial gap motor. Further, a servo press machine, which has two connecting rods for one crankshaft, has a configuration in which the axial gap motor 15 is assembled with the crankshaft between the two connecting rods.

That is, when the axial gap motor corresponding to a configuration in which a thickness thereof can be made thin in an axial direction of the motor is assembled with the crankshaft between the connecting rods in consideration of a point that a predetermined distance is needed between the two connecting rods, a drive system of a motor that drives the crankshaft, and the like may be disposed without requiring an additional space.

FIG. 1 illustrates, as the axial gap motor 15, a motor having a configuration in which two stators 17 and 18 are included for one rotor 16. However, the present embodiment is not restricted to this configuration as the axial gap motor. For example, one stator may be configured for two rotors. In addition, the number of rotors or the number of stators may be increased or decreased, or diameters thereof may be changed to adjust a torque of the press machine. Further, while one axial gap motor is assembled in FIG. 1, a plurality of axial gap motors may be assembled.

As described in the foregoing, the present embodiment is a servo press machine including a servomotor, a crankshaft rotated by driving of the servomotor, a connecting rod connected to an eccentric portion of the crankshaft, and a slide connected to the connecting rod. Herein, two connecting rods are connected to the crankshaft, the servomotor is an axial gap motor, a rotor of the axial gap motor is assembled with the crankshaft between the two connecting rods, and a stator of the axial gap motor is fixed to a crown in which the crankshaft is housed.

In this way, it is possible to provide a servo press machine having a configuration that can achieve miniaturization.

Embodiment 2

In the present embodiment, a description will be given of a servo press machine having a configuration in which miniaturization can be achieved and a servomotor is easily assembled and detached, and a motor using the same.

In Patent Document 1, when a press machine is assembled, a motor needs to be assembled with a crankshaft in advance, and then a subsidiary component for driving a slide needs to be assembled with the crankshaft. In addition, when the number of motors is changed to maintain, repair, or replace a motor, or to change performance of the press machine, the crankshaft and the subsidiary component thereof needs to be disassembled and detached in a reverse procedure. There are problems in that these operations are complicated and require time. Further, a radial gap motor used for a direct acting servo press machine in which a servomotor is directly attached to a crankshaft has a problem in that a bearing of a motor part is needed.

In this regard, in the present embodiment, a servo press machine, which can be miniaturized by assembling an axial gap motor with a crankshaft, is implemented as described in Embodiment 1, and a motor is easily assembled with and detached from a press machine using an axial gap motor in which a rotor and a stator can be dividable on an axis.

FIGS. 2A to 2D are structural diagrams of the axial gap motor in the present embodiment. Referring to FIGS. 2A to 2D, FIGS. 2A and 2B illustrate a configuration of a rotor, a reference numeral 20 denotes a split-type rotor, a reference numeral 21 denotes a permanent magnet, a reference numeral 22 denotes a hooking portion 1, a reference numeral 23 denotes a hooking portion 2, a reference numeral 24 denotes a rotor fastening hole, and a reference numeral 25 denotes a rotor core. The split-type rotor 20 is configured as illustrated in FIG. 2A by combining two rotor cores 25 illustrated in FIG. 2B divided into two parts on an axis. In addition, FIG. 2C and FIG. 2D illustrate a configuration of a stator. Here, a reference numeral 30 denotes a split-type stator, a reference numeral 31 denotes a coil, a reference numeral 32 denotes a hooking portion 1, a reference numeral 33 denotes a hooking portion 2, a reference numeral 34 denotes a stator fastening hole, and a reference numeral 35 denotes a stator core. The split-type stator 30 is configured as illustrated in FIG. 2C by combining two stator cores 35 illustrated in FIG. 2D divided into two parts on an axis. Here, concave and convex portions of hooking portions of one of the stator cores 35 is the reverse of concave and convex portions of hooking portions of the other one of the stator cores 35.

In this way, in the present embodiment, each of the rotor and the stator is divided into two parts, portions of divided places of the rotor and the stator are hooked to each other, and the rotor and the stator are configured by bolt fastening. When two divided rotors are bolted together with a crankshaft interposed therebetween, a contact pressure is generated on a contact surface of an inner diameter of the rotor and an outer diameter of the crankshaft. A torque is transmitted by a frictional force due to the contact pressure, and the rotor and the crankshaft integrally rotate. In addition, the stator is fixed to the press machine using a stator leg 36.

Further, FIGS. 3A to 3D illustrate a modified example of FIGS. 2A to 2D. In FIGS. 3A to 3D, oblique hooking portions 27 and 28 of the rotor and oblique hooking portions 37 and 38 of the stator are adopted in place of the hooking portions 22 and 23 of the rotor and the hooking portions 32 and 33 of the stator of FIGS. 2A to 2D. The other configurations are not changed. In this way, two divided parts of the rotor and the two divided parts of the stator are easily fit.

As described in the foregoing, the present embodiment is a servo press machine including a servomotor, a crankshaft rotated by driving of the servomotor, a connecting rod connected to an eccentric portion of the crankshaft, and a slide connected to the connecting rod. Herein, two connecting rods are connected to the crankshaft, the servomotor is an axial gap motor, a rotor of the axial gap motor is assembled with the crankshaft between the two connecting rods, and a stator of the axial gap motor is fixed to a crown in which the crankshaft is housed. Further, the axial gap motor is configured such that each of the rotor and the stator is dividable on an axis.

In addition, the present embodiment is a servomotor for a servo press machine in which a crankshaft is rotated by driving of the servomotor, and a rotary motion is converted into a reciprocating motion through an eccentric portion of the crankshaft to move a slide up and down through a connecting rod connected to the eccentric portion, thereby performing pressing. Here, the servomotor is an axial gap motor, and each of a rotor and a stator of the axial gap motor is dividable on an axis.

In this way, the motor is easily assembled with and detached from the press machine.

Further, a method of directly assembling a servomotor with a crankshaft using a split-type radial gap motor has problems in that a gap between a rotor and a stator has a cylindrical shape at the time of assembly, and thus centering needs to be performed, there is difficulty in adjusting the gap, and assembling with a press machine is not easy. On the other hand, a gap of the axial gap motor becomes a flat surface. Thus, for example, it is sufficient to interpose a space, and remove the space after assembly. Therefore, there is an effect that adjustment is simple.

Furthermore, there is an effect that a bearing of a motor part can be made unnecessary by fixing the stator to the press machine, and forming a gap between the crankshaft and the stator.

Embodiment 3

In the present embodiment, a description will be given of a motor having a different configuration from that of Embodiment 2.

FIGS. 4A to 4E are structural diagrams of an axial gap motor in the present embodiment. FIGS. 4A to 4E illustrate an example of a configuration of the axial gap motor which includes two stators for one rotor.

Figure 4A:
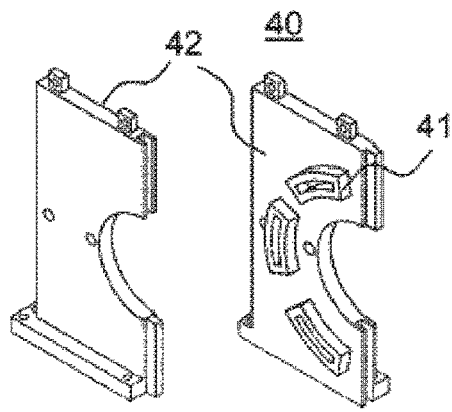
FIGS. 4A to 4E are other structural diagrams of an axial gap motor in Embodiment 3.
Figure 4B:
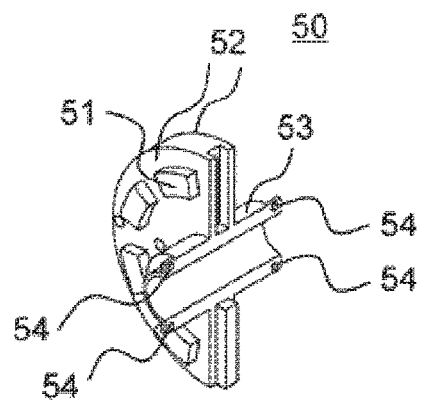
Figure 4C:
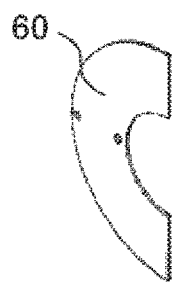
Figure 4D:
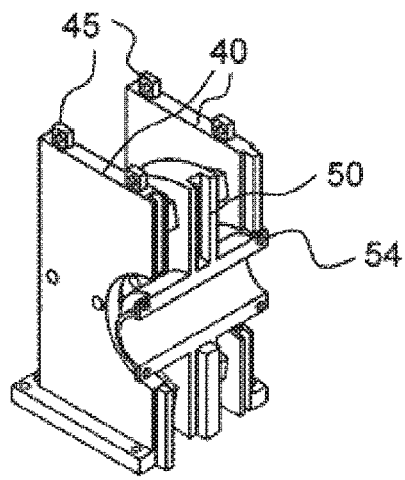
Figure 4E:
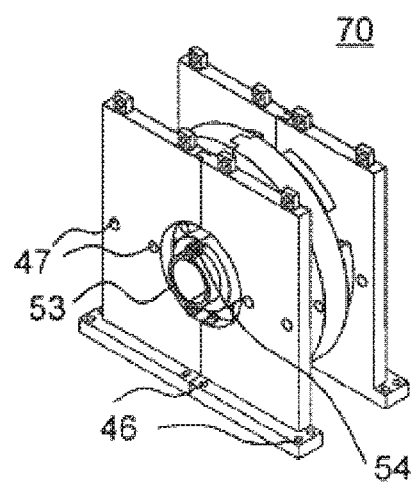

Referring to FIGS. 4A to 4E, FIG. 4A illustrates a configuration of a divided stator 40, a reference numeral 41 denotes a coil, and a reference numeral 42 denotes a coil mounting surface. In addition, FIG. 4B illustrates a configuration of a rotor 50 divided into two parts on an axis, a reference numeral 51 denotes a magnet, a reference numeral 52 denotes a magnet mounting surface, and a reference numeral 53 denotes a rotor holding member having a rotor fastening hole 54. FIG. 4C illustrates a spacer. When the spacer is interposed between a rotor and a stator, a gap between the rotor and the stator is adjusted. FIG. 4D is a divided diagram corresponding to a case in which the rotor and the stator are combined, and a reference numeral 45 indicates a protrusion portion for hanging using a crane. FIG. 4E illustrates an overall structural diagram corresponding to a case in which the rotor and the stator are combined, a reference numeral 46 denotes a through-hole for fixing the stator to a crown (for example, three through-holes per divided stator), and a reference numeral 47 denotes a through-hole for fastening the rotor, the spacer, and the stator by a bolt passing through the three members.

Referring to FIGS. 4A to 4E, a distinguishing configuration is that the rotor holding member 53 extends in an axial direction to protrude to an outside of the stator 40 corresponding to a side face in the axial direction of the axial gap motor in which the divided rotor and the divided stator are combined as illustrated in FIGS. 4D and 4E. According to this configuration, the rotor fastening hole 54 included in both end portions of the rotor holding member 53 is positioned outside the stator 40, and thus there is an advantage in that an operation of fastening a bolt may be easily performed when the rotor is combined by bolt fastening through the rotor fastening hole 54. In addition, since the rotor holding member 53 extends in the axial direction, when assembling with the crankshaft is performed by a frictional force due to bolt fastening, there is an effect that a large contact area may be set, and the frictional force may be easily obtained.

In addition, a modified example of FIGS. 4A to 4E is illustrated in FIGS. 5A to 5E. FIGS. 5A to 5E are an example of a configuration of an axial gap motor which includes one stator for two rotors.

Figure 5A:
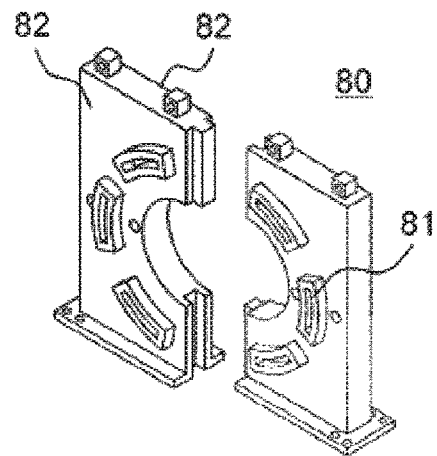
FIGS. 5A to 5E are other structural diagrams of the axial gap motor in Embodiment 3.
Figure 5B:
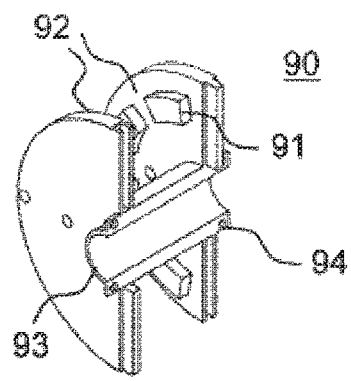
Figure 5C:
Figure 5D:
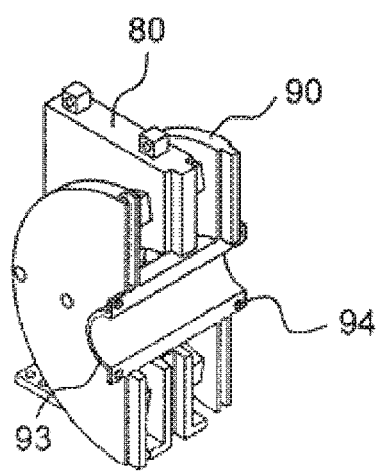
Figure 5E:
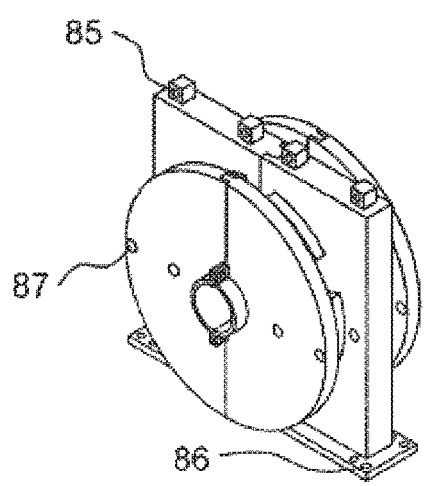

Referring to FIGS. 5A to 5E, FIG. 5A illustrates a configuration of a divided stator 80. Here, a reference numeral 81 denotes a coil, a reference numeral 82 denotes a coil mounting surface, and the coil is attached to both surfaces. In addition, FIG. 5B illustrates a configuration of a rotor 90 divided into two parts on an axis. Here, a reference numeral 91 denotes a magnet, a reference numeral 92 denotes a magnet mounting surface, and a reference numeral 93 denotes a rotor holding member having a rotor fastening hole 94. FIG. 5C illustrates a spacer, which is used to adjust a gap between the rotor and the stator similarly to FIGS. 4A to 4E. FIG. 5D is a diagram of a divided configuration corresponding to a case in which the rotor and the stator are combined. In this configuration, the stator is put between the rotors. FIG. 5E illustrates an overall structural diagram corresponding to a case in which the rotor and the stator are combined. Here, a reference numeral 85 denotes a protrusion portion for hanging using a crane, a reference numeral 86 denotes a through-hole for fixing the stator to a crown (for example, four through-holes per divided stator), and a reference numeral 87 denotes a through-hole for fastening the rotor, the spacer, and the stator by a bolt passing through the three members.

Referring to FIGS. 5A to 5E, a distinguishing configuration is that the rotor holding member 93 extends in an axial direction to protrude to an outside of a side surface of the rotor 90 corresponding to a side face in the axial direction of the axial gap motor in which the divided rotor and the divided stator are combined as illustrated in FIGS. 5D and 5E. According to this configuration, there is an advantage in that an operation of fastening a bolt may be easily performed when the rotor is combined by bolt fastening through the rotor fastening hole 94 included in both end portions of the rotor holding member 93. In addition, since the rotor holding member 93 extends in the axial direction, when assembling with the crankshaft is performed by a frictional force due to bolt fastening, there is an effect that a large contact area may be set, and the frictional force may be easily obtained.

As described in the foregoing, the present embodiment is a servo press machine including a servomotor, a crankshaft rotated by driving of the servomotor, a connecting rod connected to an eccentric portion of the crankshaft, and a slide connected to the connecting rod. Herein, two connecting rods are connected to the crankshaft, the servomotor is an axial gap motor, a rotor of the axial gap motor is assembled with the crankshaft between the two connecting rods, and a stator of the axial gap motor is fixed to a crown in which the crankshaft is housed. Further, the rotor includes a rotor holding member which has a fastening hole, and the rotor holding member extends in an axial direction to protrude from a side surface in the axial direction of the axial gap motor in which the divided rotor and the divided stator are combined. In addition, the fastening hole is disposed in a protruding portion.

In addition, the present embodiment is a servomotor for a servo press machine in which a crankshaft is rotated by driving of the servomotor, and a rotary motion is converted into a reciprocating motion through an eccentric portion of the crankshaft to move a slide up and down through a connecting rod connected to the eccentric portion, thereby performing pressing. Here, the servomotor is an axial gap motor, and each of a rotor and a stator of the axial gap motor is dividable on an axis. Further, the rotor includes a rotor holding member which has a fastening hole, and the rotor holding member extends in an axial direction to protrude from a side surface in the axial direction of the axial gap motor in which the divided rotor and the divided stator are combined. In addition, the fastening hole is disposed in a protruding portion.

In this way, the motor is easily assembled with and detached from the press machine.

Embodiment 4

In the present embodiment, a description will be given of a method of assembling a motor with a press machine and detaching the motor. FIGS. 6A to 6D are diagrams for description of a method of detaching the motor from the press machine in the present embodiment. Herein, a description will be given of a case in which the motor is an axial gap motor including two stators for one rotor illustrated in FIGS. 4A to 4E.

Figure 6A:
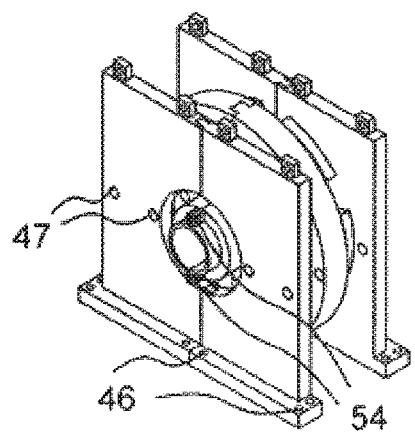
Figure 6B:
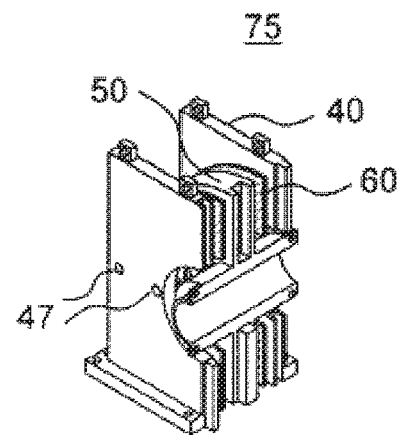

Referring to FIGS. 6A to 6D, FIG. 6A illustrates a split-type axial gap motor before detachment. Referring to FIG. 6A, first, a gap adjustment spacer is disposed between a stator and a rotor. Subsequently, the stator, the rotor, and the spacer are integrated by a bolt passing through the stator, the rotor, and the spacer using a through-hole 47 and a nut, and the like fastening the bolt. This operation is performed on a right divided part and a left divided part. In addition, a bolt of a rotor fastening portion for attaching to a crankshaft is removed from a rotor fastening hole 54, and the motor is divided into a left part and a right part. A result thereof is illustrated in FIG. 6B. In a divided axial gap motor 75, the stator 40, the rotor 50, and the spacer 60 are integrated by the bolt inserted into the through-hole 47. Subsequently, a bolt that fixes the stator and a crown is removed from a through-hole 46.

Then, as illustrated in FIG. 6C, a shackle, and the like is attached to a protrusion portion 45 for hanging using a crane which is present on an upper surface of the stator, and the divided axial gap motor 75 is hung by the crane. Then, the motor is shifted leftward (or rightward) (a direction of an arrow in the figure) up to a place in which the motor does not touch the crankshaft 8 even when the hung motor 75 is lifted. Then, as illustrated in FIG. 6D, the motor 75 is lifted using the crane and pull out from the crown 2, and the motor is placed at an arbitrary spot. Thereafter, the bolt that integrates the stator, the rotor, and the spacer is removed, and the rotor and the spacer are detached from the stator. When the above-described operation is performed on the other divided part of the motor, the motor may be detached from the crankshaft.

FIGS. 7A to 7E are diagrams for description of a method of assembling the motor with the press machine in the present embodiment. Similarly to FIGS. 6A to 6D, a description will be given of a case in which the motor is an axial gap motor including two stators for one rotor illustrated in FIGS. 4A to 4E. In particular, a description will be given of a method of newly installing the motor after assembly of the press machine is completed.

Figure 7C:
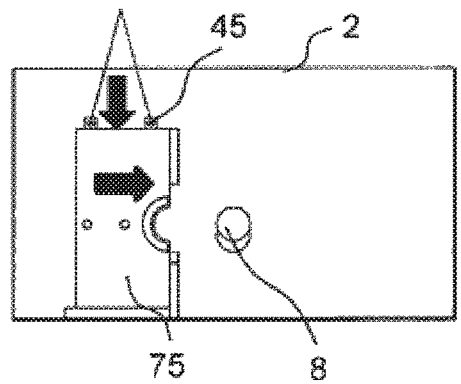
Figure 7C:
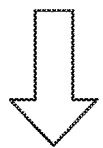
Figure 7D:
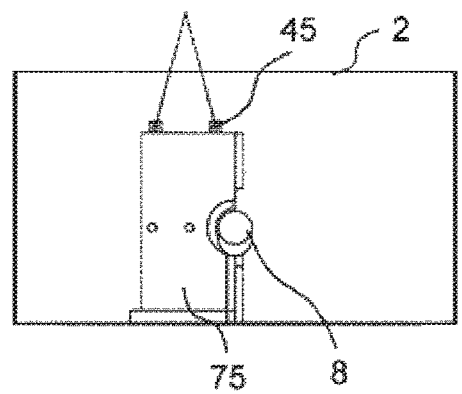

FIG. 7A illustrates the stator and the rotor of the split-type axial gap motor before installation. Referring to FIG. 7A, first, the rotor and the gap adjustment spacer are disposed between the stators. Then, the stator, the rotor, and the spacer are integrated by a bolt passing through the right (or left) stator, the rotor, and the spacer from the through-hole 47, a nut, and the like fastening the bolt. This state is illustrated in FIG. 7B. Referring to the divided axial gap motor 75 illustrated in FIG. 7B, the shackle, and the like is attached to the protrusion portion 45 for hanging using the crane which is present on the upper surface of the stator as illustrated in FIG. 7C, and the divided axial gap motor 75 is hung using the crane. Then, the motor 75 is placed at a place at which the motor 75 does not touch the crankshaft 8 inside the crown 2. After placement, as illustrated in FIG. 7D, the motor 75 and the crankshaft 8 are combined while being hung using the crane, and the stator and the crown 2 are fixed through the through-hole 46 using a bolt. The above-described operation is performed on the other divided part of the motor 75.

Figure 7E:
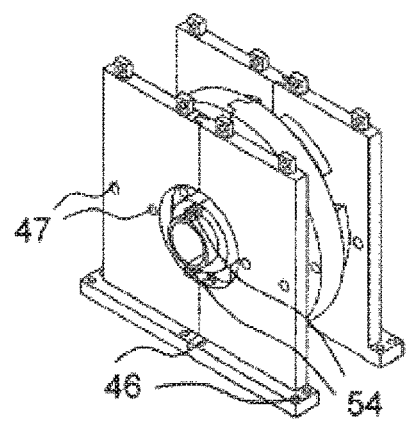

Subsequently, left and right parts of the rotor are fastened through the rotor fastening hole 54 using a bolt, and attached to the crankshaft 8. Thereafter, the bolt that integrates the stator, the rotor, and the spacer is removed from the through-hole 47, and the spacer is detached from the stator and the rotor. When above-described operation is performed on the other divided part of the motor, installation of the split-type axial gap motor is completed as illustrated in FIG. 7E.

As described in the foregoing, the present embodiment is a method of detaching a servomotor which is integrated into a servo press machine. Here, the servomotor is an axial gap motor, each of a stator and a rotor of the axial gap motor is dividable on an axis, a spacer is disposed between the stator and the rotor, the stator, the rotor, and the spacer are integrated, the stator and the rotor are divided, and each of divided parts of the axial gap motor is detached from the servo press machine.

In addition, the present embodiment is a servomotor assembly method of assembling a servomotor with a servo press machine. Here, the servomotor is an axial gap motor, each of a stator and a rotor of the axial gap motor is dividable on an axis, a spacer is disposed between a divided stator and a divided rotor, the divided stator, the divided rotor, and the spacer are integrated and set as an divided axial gap motor, each part of the stator of the divided axial gap motor is fixed to the servo press machine, divided parts of the rotor of the divided axial gap motor are fastened, and the spacer is detached, thereby assembling the servomotor.

Hereinbefore, embodiments have been described. However, the invention is not limited to the above-described embodiments, and various modified examples are included in the invention. For example, the above-described embodiments have been described in detail to facilitate the understanding the invention, and the invention is not restricted to include all described configurations. In addition, a part of a configuration of an embodiment may be replaced by a configuration of another embodiment, and a configuration of an embodiment may be added to a configuration of another embodiment. Further, with regard to a part of a configuration of each embodiment, another configuration may be added, deleted, and replaced.

The invention claimed is:

1. A servo press machine comprising:
   a servomotor;
   a crankshaft rotated by driving of the servomotor, the crankshaft including a first eccentric portion and a second eccentric portion;
   a first connecting rod and a second connecting rod respectively connected to the first eccentric portion and the second eccentric portion of the crankshaft; and
   a slide connected to the first connecting rod and the second connecting rod,
   wherein the servomotor is an axial gap motor including a rotor and a stator,
   wherein a first semi-circular rotor part and a second semi-circular rotor part are detachably fastened to each other to assemble the rotor,
   wherein the first semi-circular rotor part and the second semi-circular rotor part respectively include a first semi-circular cutout and a second semi-circular cutout such that when the first semi-circular rotor part and the second semi-circular rotor part are detachably fastened to each other, the first semi-circular cutout and the second semi-circular cutout form a first hole at a rotational axis of the assembled rotor,
   wherein the crankshaft is removably arranged through the first hole such that the assembled rotor is arranged between the first eccentric portion and the second eccentric portion of the crankshaft,
   wherein the first hole extends from a first surface of the assembled rotor to a second surface of the assembled rotor, the second surface arranged opposite the first surface of the assembled rotor,
   wherein a first stator part and a second stator part are detachably fastened to each other to assemble the stator,
   wherein the first stator part and the second stator part respectively include a third semi-circular cutout and a fourth semi-circular cutout such that when the first stator part and the second stator part are detachably fastened to each other, the third semi-circular cutout and the fourth semi-circular cutout form a second hole through which the crankshaft is inserted such that the assembled stator is arranged between the first eccentric portion and the second eccentric portion of the crankshaft,
   wherein the second hole extends from a first surface of the assembled stator to a second surface of the assembled stator, the second surface arranged opposite the first surface of the assembled stator, and
   wherein the stator of the axial gap motor is fixed to a crown in which the crankshaft is housed.

2. The servo press machine according to claim 1, wherein the first semi-circular rotor part and the second semi-circular rotor part each include first fastening holes for detachably fastening the first semi-circular rotor part and the second semi-circular rotor part to assemble the rotor, and
   wherein the first stator part and the second stator part each include second fastening holes for detachably fastening the first stator part and the second stator part to assemble the stator.

3. The servo press machine according to claim 2, wherein the first semi-circular rotor part and the second semi-circular rotor part are detachably fastened to each other through the first fastening holes using respective bolts, and
   wherein the crankshaft is arranged through the first hole of the assembled rotor using a frictional force.

4. The servo press machine according to claim 1, wherein when the first semi-circular rotor part and the second semi-circular rotor part are detachably fastened to each other to assemble the rotor, a first surface of the first semi-circular rotor part and a second surface of the second semi-circular rotor part come in contact with each other,
   wherein the first surface of the first semi-circular rotor part comprises a first hook portion, the second surface of the second semi-circular rotor part comprises a second hook portion such that the first hook portion of the first surface of the first semi-circular rotor part and the second hook portion of the second surface of the second semi-circular rotor part hook one another when the first semi-circular rotor part and the second semi-circular rotor part are detachably fastened to each other to assemble the rotor,
   when the first stator part and the second stator part are detachably fastened to each other to assemble the stator, a third surface of the first stator part and a fourth surface of the second stator part come in contact with each other, and
   wherein the third surface of the first stator part comprises a third hook portion, and the fourth surface of the second stator part comprises a fourth hook portion such that the third hook portion of the third surface of the first stator part and the fourth hook portion of the fourth surface of the second stator part hook one another when the first stator part and the second stator part are detachably fastened to each other to assemble the stator.

5. The servo press machine according to claim 2,
   wherein the first semi-circular rotor part comprises a first rotor holding member at the first semi-circular cutout of the first semi-circular rotor part,
   wherein the second semi-circular rotor part comprises a second holding member at the second semi-circular cutout of the second semi-circular rotor part,
   wherein when the first semi-circular rotor part and the second semi-circular rotor part are detachably fastened to each other to assemble the rotor, the first rotor holding member and the second rotor holding member form a tube that extends out from the first hole of the assembled rotor to accommodate the crankshaft,
   wherein a first end of the tube protrudes from the first surface of the assembled rotor such that the tube is perpendicular to the first surface of the assembled rotor, and
   wherein a second end of the tube protrudes from the second surface of the assembled rotor such that the tube is perpendicular to the second surface of the assembled rotor.

6. The servo press machine according to claim 5,
   wherein the first fastening holes for detachably fastening the first semi-circular rotor part and the second semi-circular rotor part to assemble the rotor are disposed on each of the first rotor holding member and the second rotor holding member,
   wherein a first set of the first fastening holes of the first rotor holding member are disposed at both ends of the first rotor holding member, and wherein a second set of the first fastening holes of the second rotor holding member are disposed at both ends of the second rotor holding member.

7. The servo press machine according to claim 5, wherein the tube formed by the first rotor holding member and the second rotor holding member is inserted into the second hole of the stator.

* * * * *